(12) United States Patent
Yokota et al.

(10) Patent No.: US 11,656,086 B2
(45) Date of Patent: May 23, 2023

(54) ELECTRICITY CONSUMPTION RATE PREDICTING DEVICE

(71) Applicant: HONDA MOTOR CO., LTD., Tokyo (JP)

(72) Inventors: Kazuya Yokota, Tokyo (JP); Kosuke Higashitani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/677,924

(22) Filed: Feb. 22, 2022

(65) Prior Publication Data

US 2022/0291004 A1 Sep. 15, 2022

(30) Foreign Application Priority Data

Mar. 15, 2021 (JP) .............................. JP2021-040936

(51) Int. Cl.
*G01C 21/34* (2006.01)
*B60W 30/14* (2006.01)

(52) U.S. Cl.
CPC ....... *G01C 21/3469* (2013.01); *B60W 30/146* (2013.01); *G01C 21/3492* (2013.01); *B60W 2510/081* (2013.01)

(58) Field of Classification Search
CPC ... B60K 6/00; B60L 3/00; B60L 58/00; B60L 58/12; B60L 2240/10; B60W 20/00
See application file for complete search history.

(56) References Cited

U.S. PATENT DOCUMENTS

| 10,473,474 | B2* | 11/2019 | Rajagopalan | ...... | G01C 21/3469 |
| 2014/0046595 | A1* | 2/2014 | Segawa | ................. | G01C 21/34 |
| | | | | | 701/400 |
| 2016/0245662 | A1* | 8/2016 | Rajagopalan | ...... | G01C 21/3469 |
| 2022/0291004 | A1* | 9/2022 | Yokota | ............... | G01C 21/3492 |

FOREIGN PATENT DOCUMENTS

JP 2014-066655 A 4/2014

* cited by examiner

*Primary Examiner* — John Kwon
(74) *Attorney, Agent, or Firm* — Carrier Shende & Associates, P.C.; Joseph P. Carrier; Jeffrey T. Gedeon

(57) ABSTRACT

Vehicle speed data of a plurality of vehicles registered for each link of map information and respective average vehicle speeds calculated from the vehicle speed data are acquired, and the links are divided into vehicle speed groups according to the magnitude of the average vehicle speed. For each of the vehicle speed groups, the vehicle speed data of the plurality of vehicles is collectively subjected to frequency distribution analysis, and a predicted vehicle speed transition simulating a change in vehicle speed is calculated for each of the vehicle speed groups. An electricity consumption rate model of the vehicle is applied to the calculated predicted vehicle speed transition to predict an electricity consumption rate corresponding to the average vehicle speed for each of the vehicle speed groups.

4 Claims, 10 Drawing Sheets

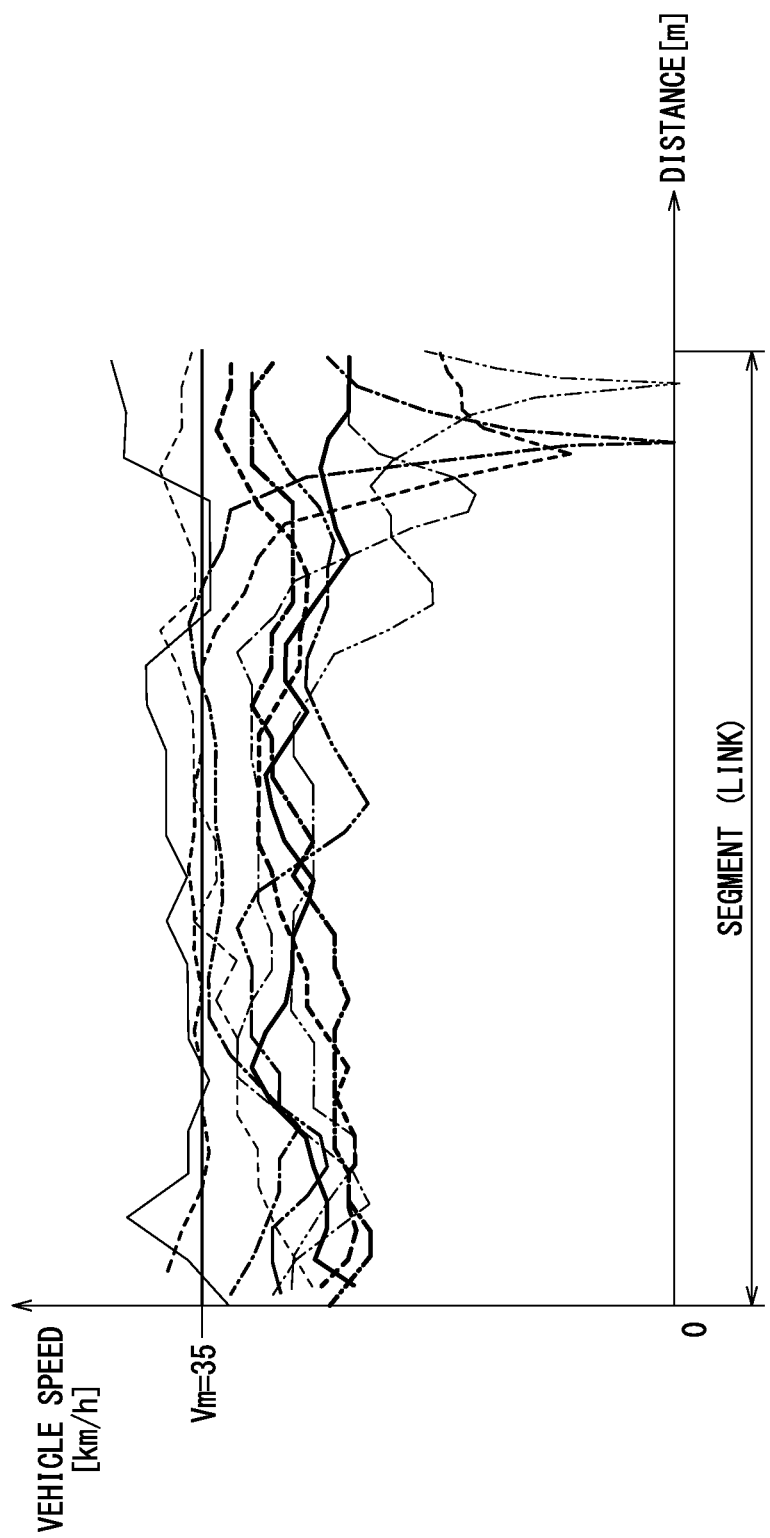

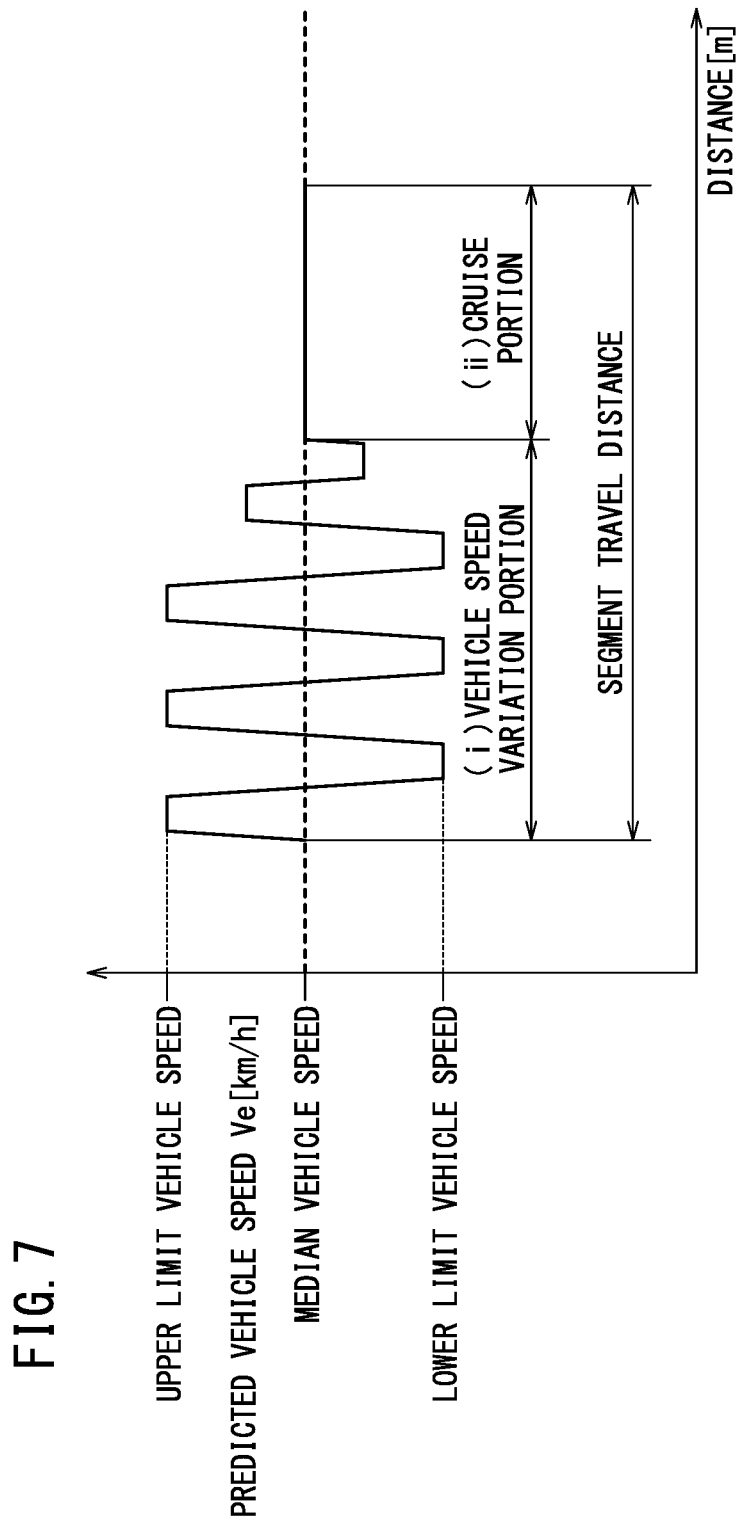

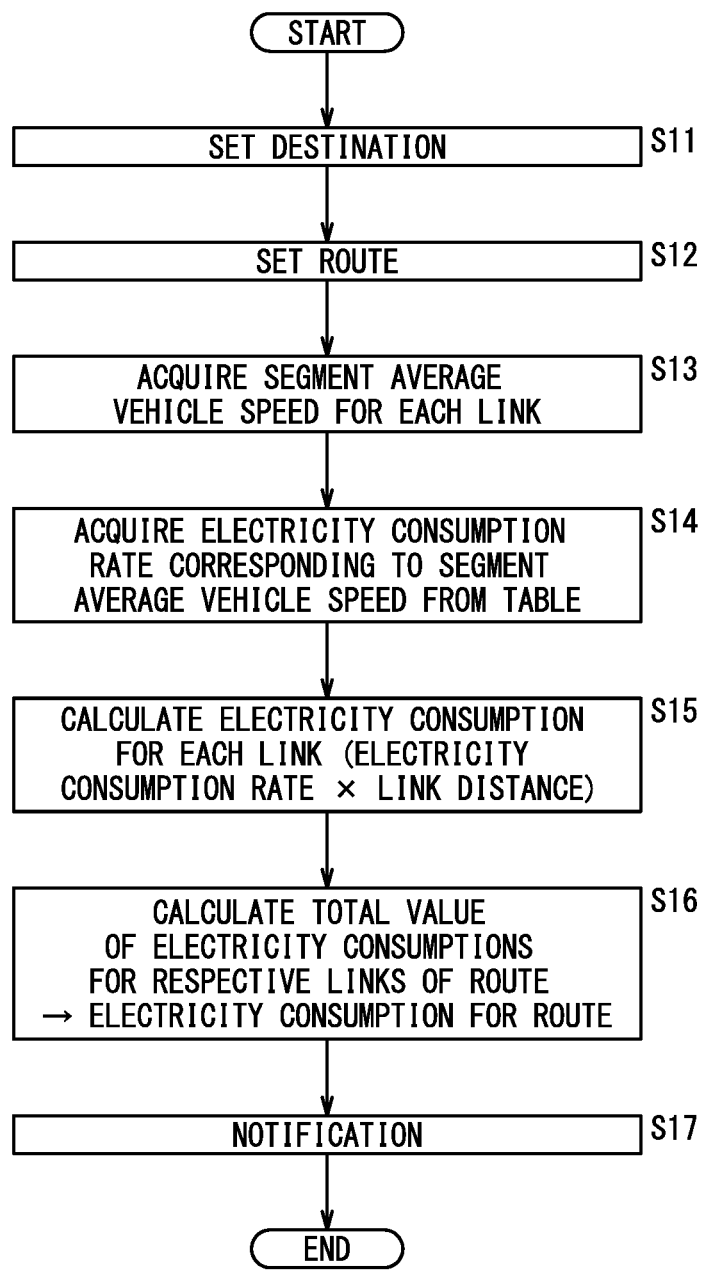

ELECTRICITY CONSUMPTION RATE PREDICTING DEVICE

CROSS-REFERENCE TO RELATED APPLICATIONS

This application is based upon and claims the benefit of priority from Japanese Patent Application No. 2021-040936 filed on Mar. 15, 2021, the contents of which are incorporated herein by reference.

BACKGROUND OF THE INVENTION

Field of the Invention

The present invention relates to an electricity consumption rate predicting device for predicting the electricity consumption rate of a vehicle (electric vehicle) that travels by a motor.

Description of the Related Art

Generally, in an electric vehicle which travels by using a motor as a drive source with the electric power of a battery, the cruising range corresponding to the amount of one fuel supply (electric power charging or supply of oil) up to full amount is shorter than that in an engine vehicle which travels by using a gasoline engine as a drive source.

Therefore, in an electric vehicle, if the electricity consumption from a starting point to a destination is known at the time of route setting by a navigation device, it is possible to determine whether or not running out of electric power occurs before the vehicle travels. The user's convenience is also improved. The electricity consumption is calculated as follows: electricity consumption=electricity consumption rate [Wh/km]×travel distance [km].

It should be noted that the electricity consumption rate refers to the electricity consumption per unit travel distance of the electric vehicle. (The unit of the electricity consumption rate is [Wh/km] or [kWh/100 km].)

For example, JP 2014-066655 A discloses a route search device for performing route search in consideration of electricity consumption from a starting point to a destination.

In this route search device, links (road links) are previously patterned by a gradient, a curvature, the number of installed traffic lights, and the like, which are strongly related to electricity consumption. The electricity consumptions collected from the electric vehicle that has traveled by the patterned link unit are totaled. Based on this totaling result, the electricity consumption for the road where the electric vehicle has not traveled is predicted (estimated).

SUMMARY OF THE INVENTION

Unlike an engine vehicle, in an electric vehicle that travels by a motor, the electricity consumption rate increases in accordance with an increase in vehicle speed in a speed range during normal driving or higher range. That is, the electricity consumption rate correlates with the vehicle speed.

Therefore, in order to accurately predict the electricity consumption rate in an electric vehicle, it is necessary to grasp a change in the vehicle speed within a link which is a road segment connecting intersections, corners, dead ends, and the like.

However, in JP 2014-066655 A, the electricity consumption rate is calculated only by classifying the vehicle speed in the link into traffic jam, traffic congestion, and smooth traffic. As a result, since the change in the vehicle speed within the link is not grasped, there is a problem that the prediction accuracy of the electricity consumption rate is low.

The present invention has been made in view of such a problem and an object thereof is to provide an electricity consumption rate predicting device capable of improving the prediction accuracy of the electricity consumption rate by predicting the electricity consumption rate in consideration of a change in vehicle speed.

According to an aspect of the present invention, provided is an electricity consumption rate predicting device that predicts an electricity consumption rate of a vehicle that travels by a motor, wherein the electricity consumption rate predicting device: acquires vehicle speed data of a plurality of vehicles registered for each link in map information, and average vehicle speeds calculated from the vehicle speed data; divides the links into vehicle speed groups according to a magnitude of each of the average vehicle speeds; performs statistical processing on the vehicle speed data of the plurality of vehicles for each of the vehicle speed groups, and calculates, based on the statistical processing, a predicted vehicle speed transition simulating a change in vehicle speed for each of the vehicle speed groups; and applies an electricity consumption rate model of the vehicle to the calculated predicted vehicle speed transition to predict an electricity consumption rate corresponding to the average vehicle speed for each of the vehicle speed groups.

According to the present invention, instead of the average vehicle speed for each link, the links are divided into the vehicle speed groups according to the magnitude of the average vehicle speed, the statistical processing is performed on the vehicle speed data of the plurality of vehicles for each of the vehicle speed groups, the predicted vehicle speed transition simulating the change in the vehicle speed is calculated for each of the vehicle speed groups based on the statistical processing, and the electricity consumption rate model of the vehicle is applied to the calculated predicted vehicle speed transition to predict the electricity consumption rate corresponding to the average vehicle speed for each of the vehicle speed groups. Therefore, the prediction accuracy of the electricity consumption rate can be improved.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is an explanatory diagram of a group of vehicle speed data;

FIG. 7 is a schematic view showing an image of the predicted vehicle speed (predicted vehicle speed transition);

FIG. 8 is a flowchart for explaining the operation of calculating an electricity consumption for a route from a starting point to a destination;

DESCRIPTION OF THE INVENTION

An embodiment of an electricity consumption rate predicting device according to the present invention will be described below in detail with reference to the accompanying drawings.

[Configuration]

Figure 1:
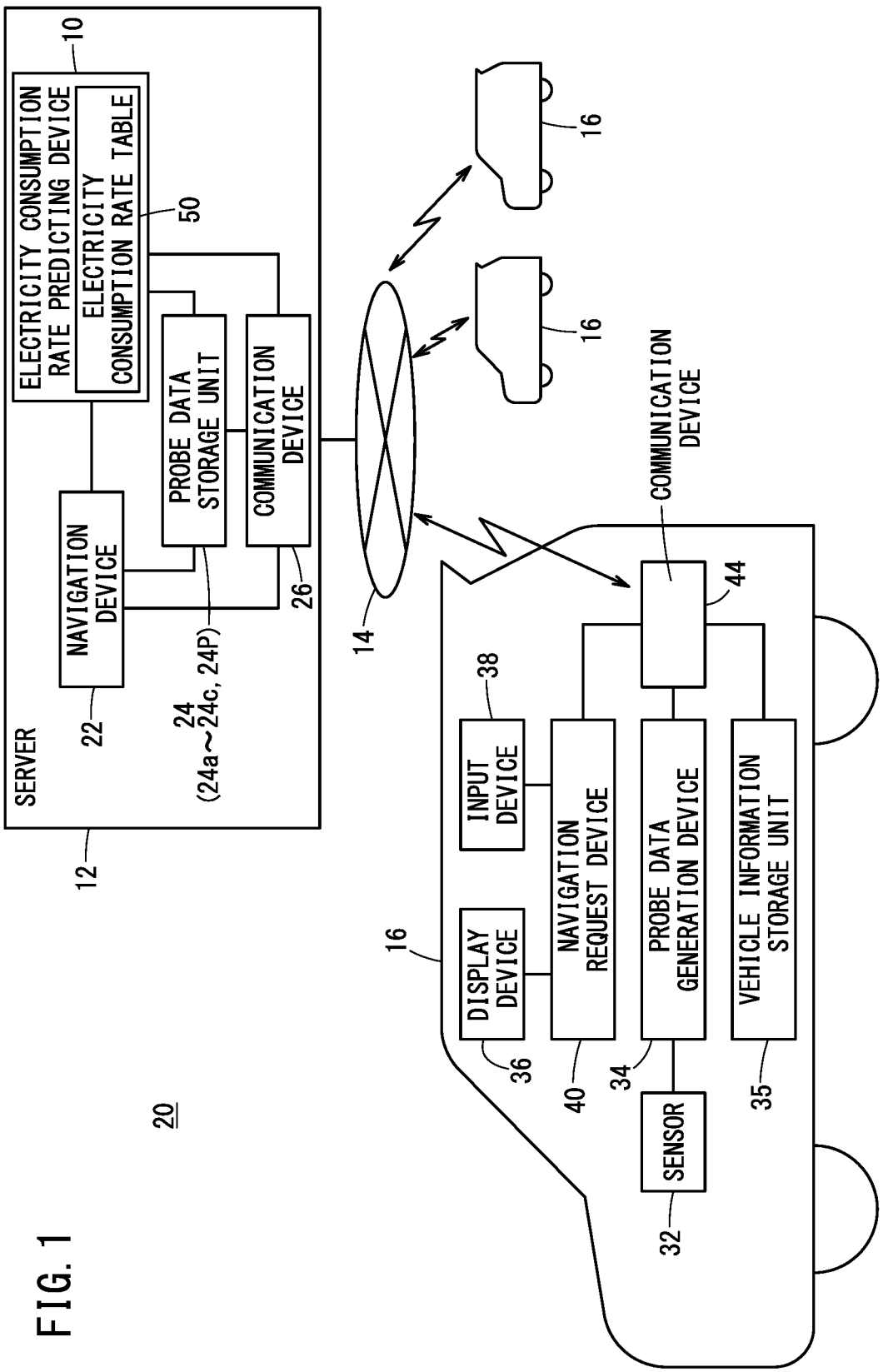
FIG. 1 is a block diagram showing an example of the configuration of an electricity consumption rate predicting system constituted by a server provided with an electricity consumption rate predicting device according to an embodiment of the present invention, and a plurality of electric vehicles connected to the server via a communication network.

FIG. 1 is a block diagram showing an example of the configuration of an electricity consumption rate predicting system 20 constituted by: a server 12 including an electricity consumption rate predicting device 10 according to an embodiment of the present invention; and a plurality of electric vehicles (also referred to simply as vehicles) 16. The server 12 and the vehicles 16 are connected via a communication network 14.

The vehicle 16 travels by converting electric power of a battery (not shown) mounted on the vehicle 16 into propulsion for the vehicle 16 via a traveling motor (not shown).

The server 12 includes a navigation device 22, a probe data storage unit 24, and a communication device 26, in addition to the electricity consumption rate predicting device 10 for predicting the electricity consumption rate of the vehicle 16.

The vehicle 16 includes a sensor 32, a probe data generation device 34, a vehicle information storage unit 35, a display device 36, an input device 38, a navigation request device 40, and a communication device 44.

Although three vehicles 16 are shown in FIG. 1 for convenience of understanding, the vehicle 16 in which the internal components are illustrated is referred to as a user's own vehicle 16, and the vehicle 16 for which only the outer shape is illustrated is referred to as the other vehicle 16 as necessary.

The communication device 44 of the vehicle 16 and the communication device 26 of the server 12 perform bidirectional communication via the communication network 14 such as the Internet including a mobile communication network. The communication device 44 of the vehicle 16 may be replaced by a smart device such as a smartphone.

The smart device is a terminal carried by a user such as a driver of the electric vehicle 16.

In the electricity consumption rate predicting system 20 in the example of FIG. 1, the server 12 including the navigation device 22 receives a route search request (including a destination) from the navigation request device 40 of the vehicle 16, and collects probe data from the probe data generation device 34. The server 12, which has received the route search request and collected the probe data, predicts the electricity consumption rate and performs the route search. The server 12 provides the vehicle 16 with a route search result added with the electricity consumption (=electricity consumption rate×distance from the starting point to the destination).

The navigation device 22 and the electricity consumption rate predicting device 10 (for user's own vehicle) may be mounted on the vehicle 16.

The probe data is information such as travel trajectory data, the electricity consumption, and the state of charge (SOC) of the battery accompanying the travel of the vehicle 16, and is associated with each vehicle 16 (vehicle ID).

The electricity consumption includes, in addition to an electric electricity consumption during traveling by the motor, an electricity consumption of an auxiliary load such as an air conditioner during traveling or stopping.

The sensor 32 of the vehicle 16 includes a GPS sensor (position information/time information acquisition sensor), an acceleration sensor, a vehicle speed sensor, a battery SOC sensor, an image sensor for recognizing a user such as a driver, and an auxiliary on/off sensor (or auxiliary on/off switch).

In the vehicle information storage unit 35, the type of the vehicle 16 and driver characteristics (such as a passive or active driving tendency which can be grasped from past speed history, acceleration/deceleration number history, etc.) of a driver who drives the vehicle, are recorded.

In the probe data storage unit 24 of the server 12, vehicle information such as vehicle type data received from the vehicle 16, and probe data for each vehicle 16, are recorded.

Basically, the navigation device 22 searches for a route by referring to recorded map information and transmits a route search result to the vehicle 16.

The probe data includes vehicle speed data for each link on which the vehicle 16 has traveled.

Here, the vehicle speed data for each link is time series data of the vehicle speed, in which the horizontal axis represents a position within the link, the vertical axis represents the vehicle speed at that position, and is continuous data of vehicle speed values for each unit distance from one node to the other node of the link.

The electricity consumption rate predicting device 10 of the server 12 refers to the probe data in the probe data storage unit 24 to generate in advance an electricity consumption rate table 50 corresponding to the type of the vehicle 16 and an average vehicle speed (segment average vehicle speed (link average vehicle speed) to be described later).

In FIG. 1, the navigation request device 40 and the probe data generation device 34 on the vehicle 16 side, and the electricity consumption rate predicting device 10 and the navigation device 22 on the server 12 side are each constituted by a microcomputer in which a CPU executes a program recorded in a memory to achieve various calculation functions. These devices can also be constituted by hardware.

Figure 2:
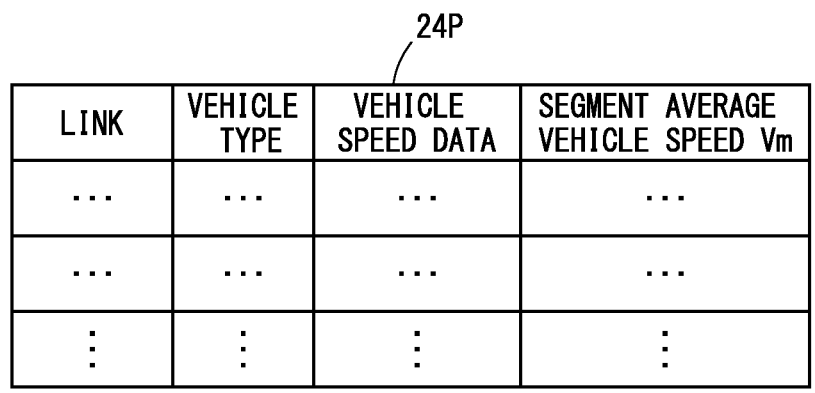
FIG. 2 is an explanatory diagram showing an example of the configuration of probe data recorded in a probe data storage unit.

FIG. 2 shows an example of the configuration of post-processing probe data 24P processed by the electricity consumption rate predicting device 10 and recorded in the probe data storage unit 24. The probe data transmitted from the vehicle 16 to the server 12 every moment is only the vehicle ID (by which the vehicle type can be identified) and position history.

For this reason, the electricity consumption rate predicting device 10 records, as the probe data 24P, data formed of the type of the vehicle 16, the vehicle speed data of the vehicle 16, and a segment average vehicle speed Vm, in association with the link on which the vehicle 16 has traveled. (A link ID is used to identify a specific link.)

The segment average vehicle speed is average value data of the vehicle speed data within a segment (link). As described above, the vehicle speed data is continuous data obtained by plotting the vehicle speed for each unit distance from one node to the other node within the specific link (see FIG. 6).

Figure 3:
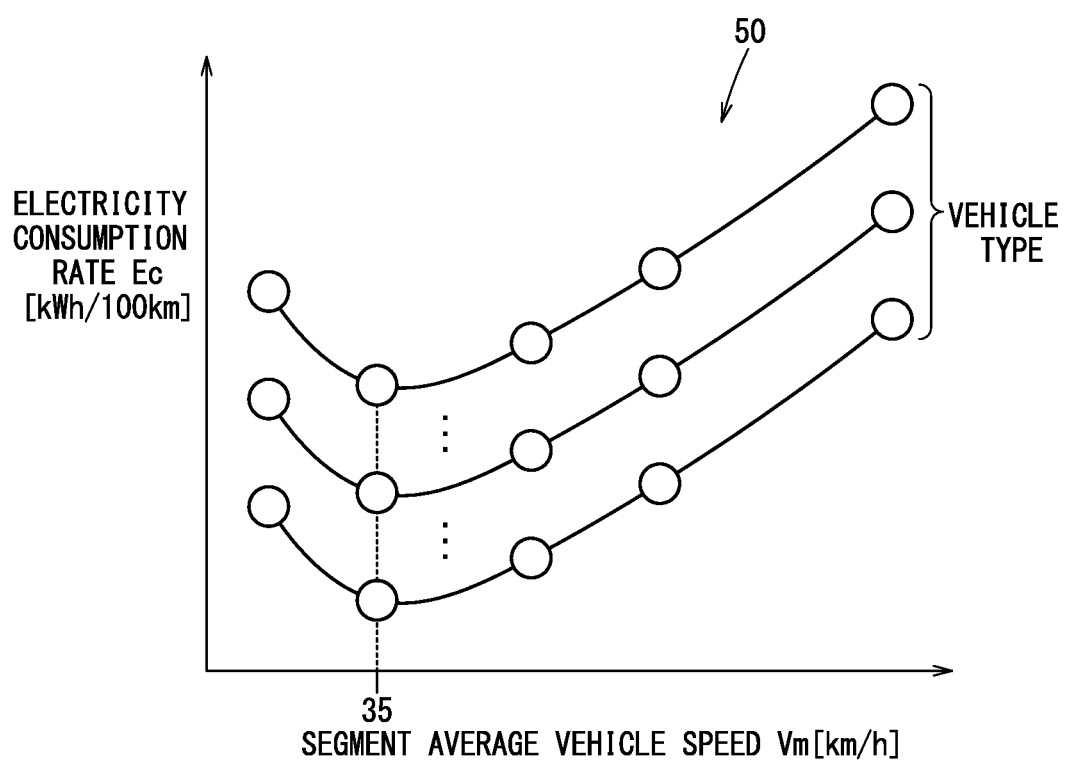
FIG. 3 is an explanatory diagram showing an example of an electricity consumption rate table of a vehicle created by the electricity consumption rate predicting device.

FIG. 3 shows an example of the electricity consumption rate table 50 of the vehicle 16 created by the electricity consumption rate predicting device 10. The electricity consumption rate table 50 is a table for acquiring an electricity consumption rate Ec [kWh/100 km] corresponding to the segment average vehicle speed Vm [km/h] for each type of the vehicle 16. The segment average vehicle speed is also referred to as a link average vehicle speed or simply an average vehicle speed.

The vehicle 16 is an electric vehicle, and it can be understood that the electricity consumption rate Ec increases substantially in proportion to the segment average vehicle speed Vm when the segment average vehicle speed Vm is about 35 [km/h] or more.

On the low vehicle speed side of less than about 35 [km/h], the vehicle tends to travel with a high frequency of acceleration and deceleration due to the influence of a large amount of traffic or a high frequency of stopping at the traffic lights or the like. Therefore, the electricity consumption rate Ec of the vehicle 16 increases as the segment average vehicle speed Vm decreases.

[Operation]

The operation of the electricity consumption rate predicting system 20 including the electricity consumption rate predicting device 10 basically configured as described above will be described in the order of (1) to (3) below.

(1) Method for creating the electricity consumption rate table 50
(2) Operation of calculating an electricity consumption for a route from a starting point to a destination
(3) Method for predicting an electricity consumption rate and an electricity consumption in a specific segment (link) in a case where the specific segment (link) is set in the navigation device 22

(1) Method for Creating the Electricity Consumption Rate Table 50

Figure 4:
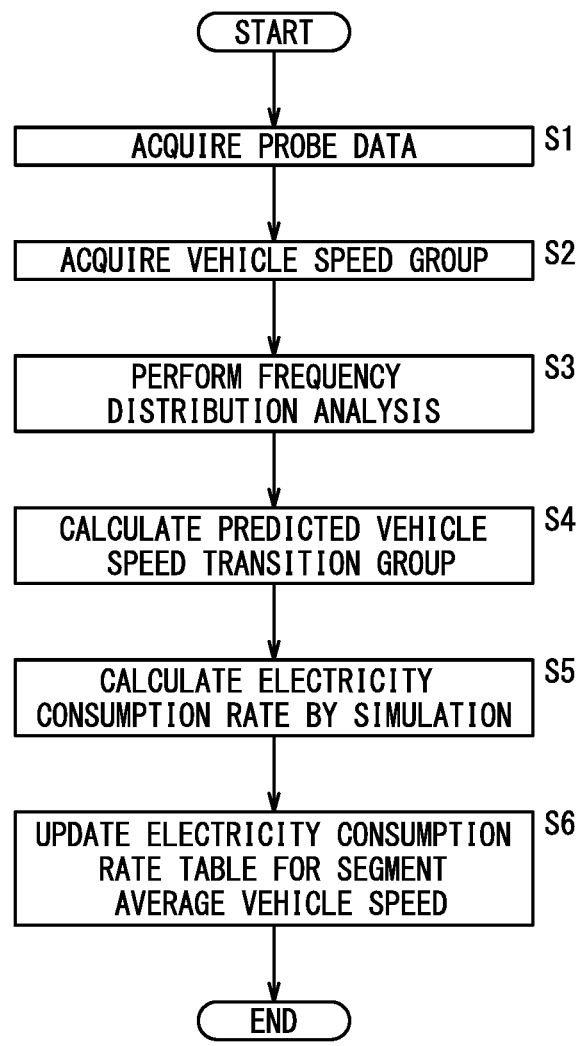
FIG. 4 is a flow chart for creating the electricity consumption rate table by the electricity consumption rate predicting device.

A method of creating the electricity consumption rate table 50 by the electricity consumption rate predicting device 10 will be described with reference to the flowchart of FIG. 4.

In step S1, the electricity consumption rate predicting device 10 acquires probe data, which is created every moment by the probe data generation device 34 of the vehicle 16, through the communication device 44, the communication network 14, and the communication device 26. The electricity consumption rate predicting device 10 processes the acquired probe data into the probe data 24P shown in FIG. 2 and records the probe data 24P in the probe data storage unit 24.

Figure 5:
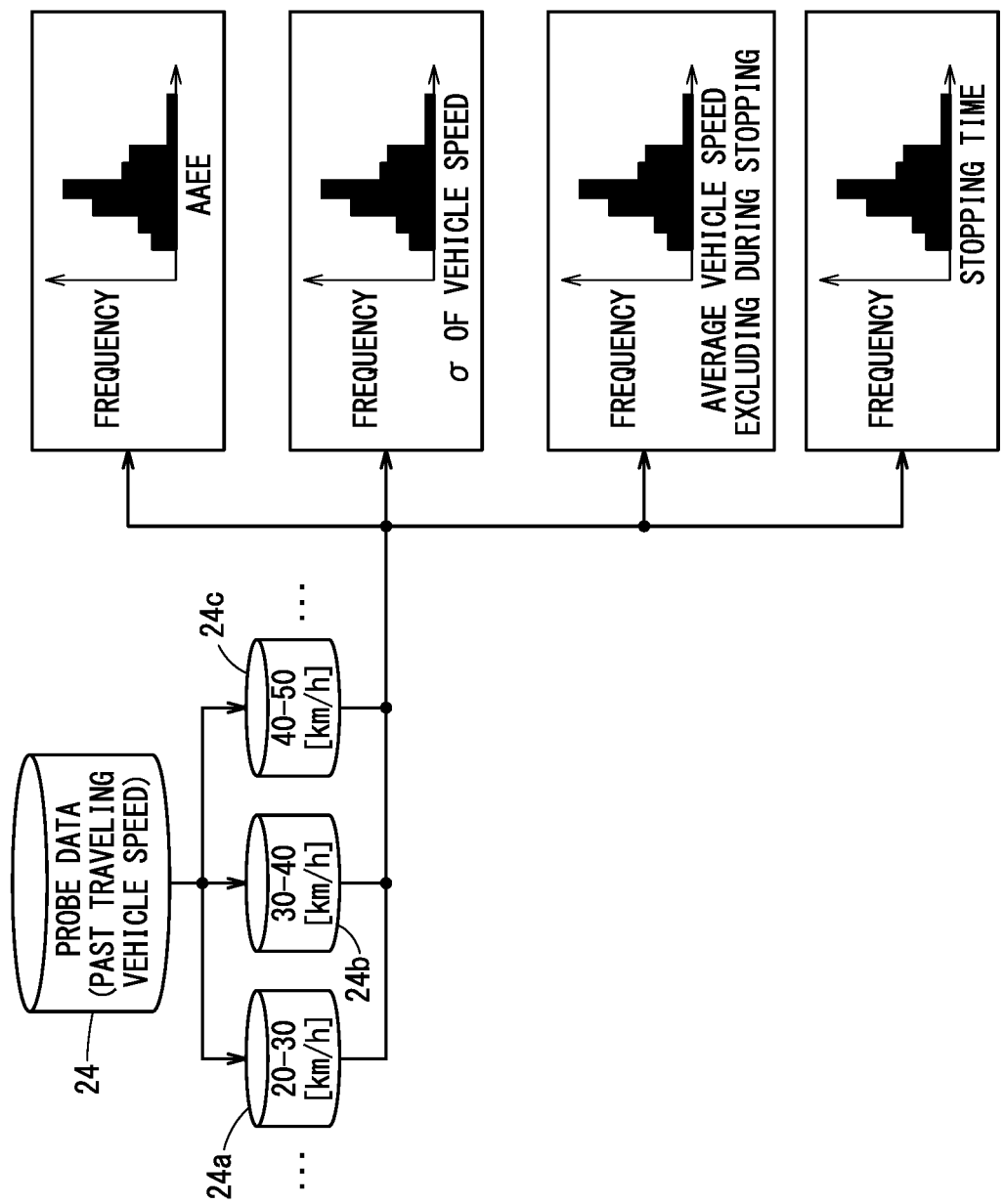
FIG. 5 is an explanatory diagram of classification of probe data into each vehicle speed range, and frequency distribution analysis.

As shown in FIG. 5, in the probe data storage unit 24, the probe data 24P is recorded for each segment average vehicle speed range (link average vehicle speed range), by being divided into a low-speed side average vehicle speed probe data group 24a, a medium-speed side average vehicle speed probe data group 24b, and a high-speed side average vehicle speed probe data group 24c.

The average vehicle speed probe data groups 24a, 24b, 24c are also referred to as vehicle speed groups 24a, 24b, 24c, respectively.

For example, the low speed means 20-30 [km/h], the medium speed means 30-40 [km/h]), and the high speed means 40-50 [km/h] or more.

Each of the vehicle speed groups 24a to 24c also includes probe data 24P of different vehicle types and different segments (links). Further, the vehicle speed range of the vehicle speed groups (24a to 24c) may not be divided every 10 [km/h].

In step S2, the electricity consumption rate predicting device 10 acquires, for example, the vehicle speed group 24b of 35 [km/h] out of 30-40 [km/h] on the medium speed side.

FIG. 6 shows vehicle speed data constituting the acquired vehicle speed group 24b of an average vehicle speed of 35 [km/h]. The vehicle speed data is data (time-series vehicle speed data) indicating a vehicle speed (time-series vehicle speed) of each vehicle 16 that changes from moment to moment with respect to a distance within a link (segment).

Next, in step S3, as schematically shown in FIG. 5, consumption elements are decomposed into AAEE (see expression (1) below), a standard deviation σ, an average vehicle speed, a stopping time, and the like for the vehicle speed group 24b of an average vehicle speed of 35 [km/h], and frequency distribution analysis is performed for each of them.

The AAEE is an acceleration energy equivalent per kilometer [(m/s)²/km] related to the acceleration resistance energy. The standard deviation σ is a standard deviation of the segment average vehicle speed Vm related to the running resistance energy. The average vehicle speed is the average vehicle speed excluding the stopping time. The stopping time is used for calculating the auxiliary load consumption related to the consumed energy during stopping.

$$AAEE = (1/D)\Sigma\delta_k(v_k^2 - v_{k-1}^2) \quad (1)$$

Where the range of Σ is variable k=1 to K, $_k$ is a measurement time interval, D [km] is a travel distance during the measurement time (segment travel distance), K is a value obtained by dividing the travel distance D by the measurement time interval $_k$, $v_k$ [m/sec] is a speed in the measurement time interval (measurement cycle), and $\delta_k$ takes 1 during acceleration and takes 0 otherwise.

The consumed energy during traveling is the sum of the acceleration energy and the running resistance energy.

Therefore, the consumed energy on the route is calculated as a value obtained by adding the consumed energy during stopping to the consumed energy during traveling, as shown in the following expression (2).

Consumed Energy on Route=Consumed Energy during Traveling (Acceleration Resistance Energy+ Running Resistance Energy)+Consumed Energy during Stopping (2)

Next, in step S4, a predicted vehicle speed transition (predicted vehicle speed) Ve is calculated. In practice, a predicted vehicle speed transition group is calculated for each of the vehicle speed groups 24a to 24c.

FIG. 7 shows an image (schematic diagram) of the predicted vehicle speed transition Ve.

The predicted vehicle speed transition Ve is calculated by dividing the segment travel distance into (i) a vehicle speed variation portion and (ii) a cruise portion.

In the vehicle speed variation portion (i) shown in FIG. 7, the number of vehicle speed variations (number of accelerations) is obtained as follows: acceleration energy (AAEE×acceleration travel distance×vehicle weight)/energy necessary for one cycle acceleration [(½)×vehicle weight×{(upper limit vehicle speed^ 2)−(lower limit vehicle speed^2)}].

The upper and lower limit vehicle speeds (upper limit vehicle speed and lower limit vehicle speed) shown in FIG. 7 are equal to {average vehicle speed excluding during stopping±(standard deviation of vehicle speed)}.

The median vehicle speed shown in FIG. 7 is the average vehicle speed excluding during stopping.

In the vehicle speed variation portion (i) of FIG. 7, the upper and lower limit cruise travel times (the cruise travel time at the upper limit vehicle speed and the cruise travel time at the lower limit vehicle speed) are respectively equal to {(vehicle speed variation portion travel time−time required for acceleration/deceleration)}. Here, the vehicle speed variation portion travel time refers to the total travel time for traveling the distance [m] of the side of the upward trapezoidal portion having no bottom side and the distance [m] of the side of the downward trapezoidal portion having no bottom side.

The vehicle speed variation range of the final cycle in the vehicle speed variation portion (i) in FIG. 7 is adjusted such that, when the acceleration energy is not equal to {the energy required for one cycle acceleration×the number of vehicle speed variations (number of accelerations)}, the vehicle is accelerated to a vehicle speed, by which the remaining acceleration energy is consumed.

In the cruise portion (ii), the median vehicle speed is the average vehicle speed excluding during stopping, and the cruise time is "segment travel time−vehicle speed variation portion time".

Next, in step S5, an electricity consumption rate model (electricity consumption rate per vehicle speed at cruising time, electricity consumption rate during acceleration) of the vehicle determined in advance for each vehicle type is applied to the predicted vehicle speed transition Ve shown in FIG. 7, and the electricity consumption rate Ec for the vehicle speed group 24b of an average vehicle speed of 35 [km/h] shown in FIG. 7 and the other vehicle speed groups 24a and 24c is calculated for each vehicle type (see the portions with circles in FIG. 3).

In step S6, when the electricity consumption rate Ec is updated, the electricity consumption rate table 50 for the segment average vehicle speed is updated.

In the electricity consumption rate table 50 shown in FIG. 3, after the update, the electricity consumption rate between the plots of the adjacent electricity consumption rates Ec of the same vehicle type is obtained by spline interpolation or linear interpolation. Thus, the electricity consumption rate table 50 is created.

(2) Operation of Calculating an Electricity Consumption for a Route from a Starting Point to a Destination Next, a description will be given, with reference to the flowchart of FIG. 8, of a function of calculating the electricity consumption for a route from the starting point to the destination calculated by the navigation device 22. This function is one of the functions of the electricity consumption rate predicting device 10.

In step S11, the destination set using the input device 38 is transmitted from the navigation request device 40 of the vehicle 16 to the navigation device 22 of the server 12 via the communication device 44, the communication network 14, and the communication device 26.

Then, in step S2, the navigation device 22 refers to the map data to set a recommended route (route obtained by connecting the links from the starting point to the destination) guidance.

Next, in step S13, the electricity consumption rate predicting device 10 refers to the vehicle speed groups 24a, 24b and the like shown in FIG. 5 for each of the links set by the navigation device 22, and acquires the average vehicle speed (segment average vehicle speed) Vm for each of the set links.

Next, in step S14, the electricity consumption rate predicting device 10 refers to the electricity consumption rate table 50 shown in FIG. 3 to acquire the electricity consumption rate Ec corresponding to the average vehicle speed Vm for each vehicle type and each link.

Next, in step S15, the electricity consumption rate predicting device 10 calculates the electricity consumption for each link by multiplying the acquired electricity consumption rate for each link by the distance in each link.

Next, in step S16, the electricity consumption rate predicting device 10 calculates a total value of the electricity consumptions for the links of the route to calculate the electricity consumption for the route.

Then, in step S17, a navigation guide route and the electricity consumption for the guide route are displayed (notified) on the display device 36 of the vehicle 16 via the navigation request device 40, from the communication device 26 of the server 12 through the communication network 14 and the communication device 44 of the vehicle 16.

Here, referring now to FIGS. 9A and 9B, an example of the difference in effect regarding the segment electricity consumption between when the predicted vehicle speed transition is estimated and when the predicted vehicle speed transition is not estimated will be described.

Figure 9A:
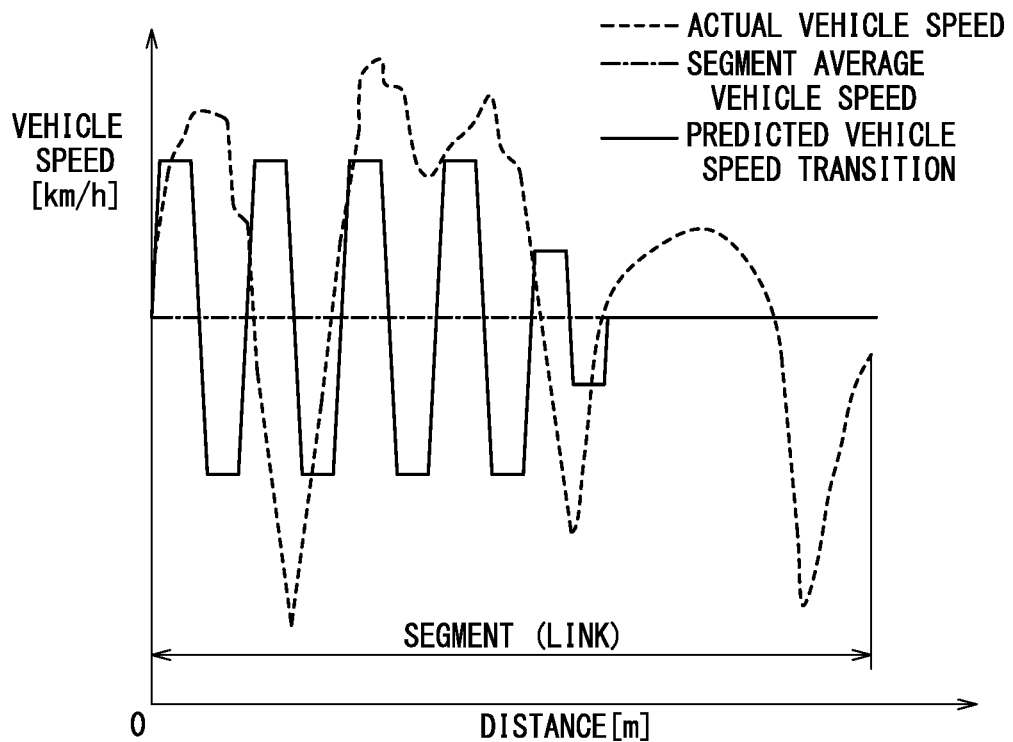
FIG. 9A is an explanatory diagram for explaining an actual vehicle speed, a segment average vehicle speed, and a predicted vehicle speed transition.

In FIG. 9A, an actual vehicle speed change (vehicle speed data) of the vehicle 16 (user's own vehicle) traveling on the link (segment) is indicated by a broken line. A segment average vehicle speed of the vehicle 16 (user's own vehicle) calculated from the vehicle speed data is indicated by a dash-dot line. A predicted vehicle speed transition calculated based on the frequency distribution analysis (statistical processing) of vehicle speed data of other vehicles 16 (other vehicles) traveling on the same link (segment) is indicated by a solid line.

Figure 9B:
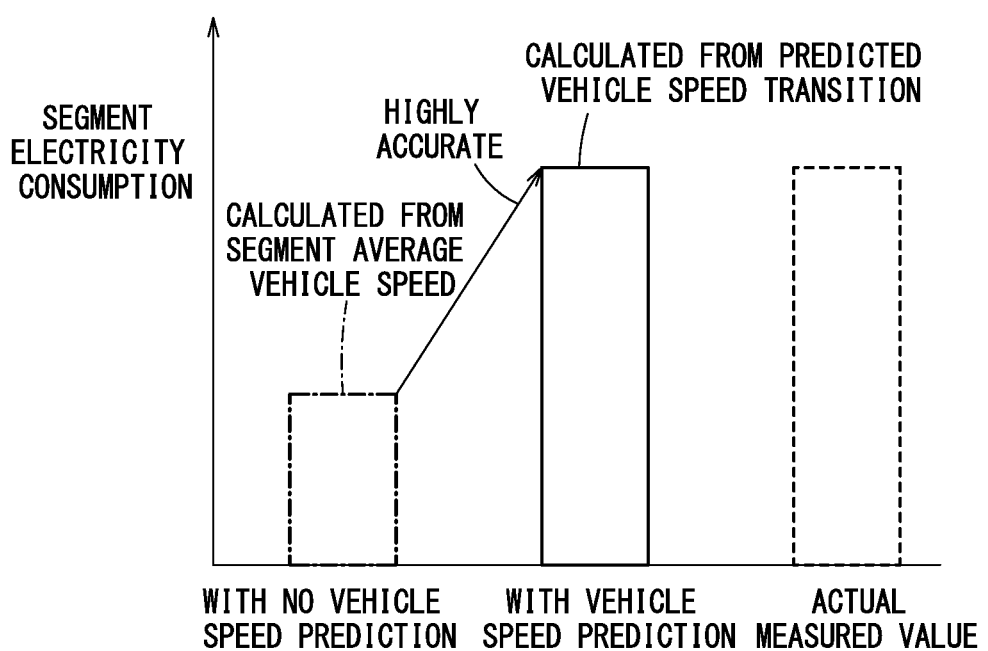
FIG. 9B is an explanatory diagram for comparing the electricity consumption based on the actual vehicle speed, the electricity consumption based on the segment average vehicle speed, and the electricity consumption based on the predicted vehicle speed transition in each segment.

In FIG. 9B, the segment electricity consumption calculated from the segment average vehicle speed (with no vehicle speed prediction) is indicated by a bar graph of dash-dot lines. Also, the segment electricity consumption calculated from the predicted vehicle speed transition is indicated by a bar graph of solid lines. Further, the actual measured value of the segment electricity consumption when the vehicle travels with the vehicle speed change indicated by the broken line in FIG. 9A is indicated by a bar graph of broken lines.

As described above, it can be understood that the segment electricity consumption calculated from the predicted vehicle speed transition is closer to the actual measured value and is more accurate than the segment electricity consumption calculated with no vehicle speed prediction.

Figure 10:
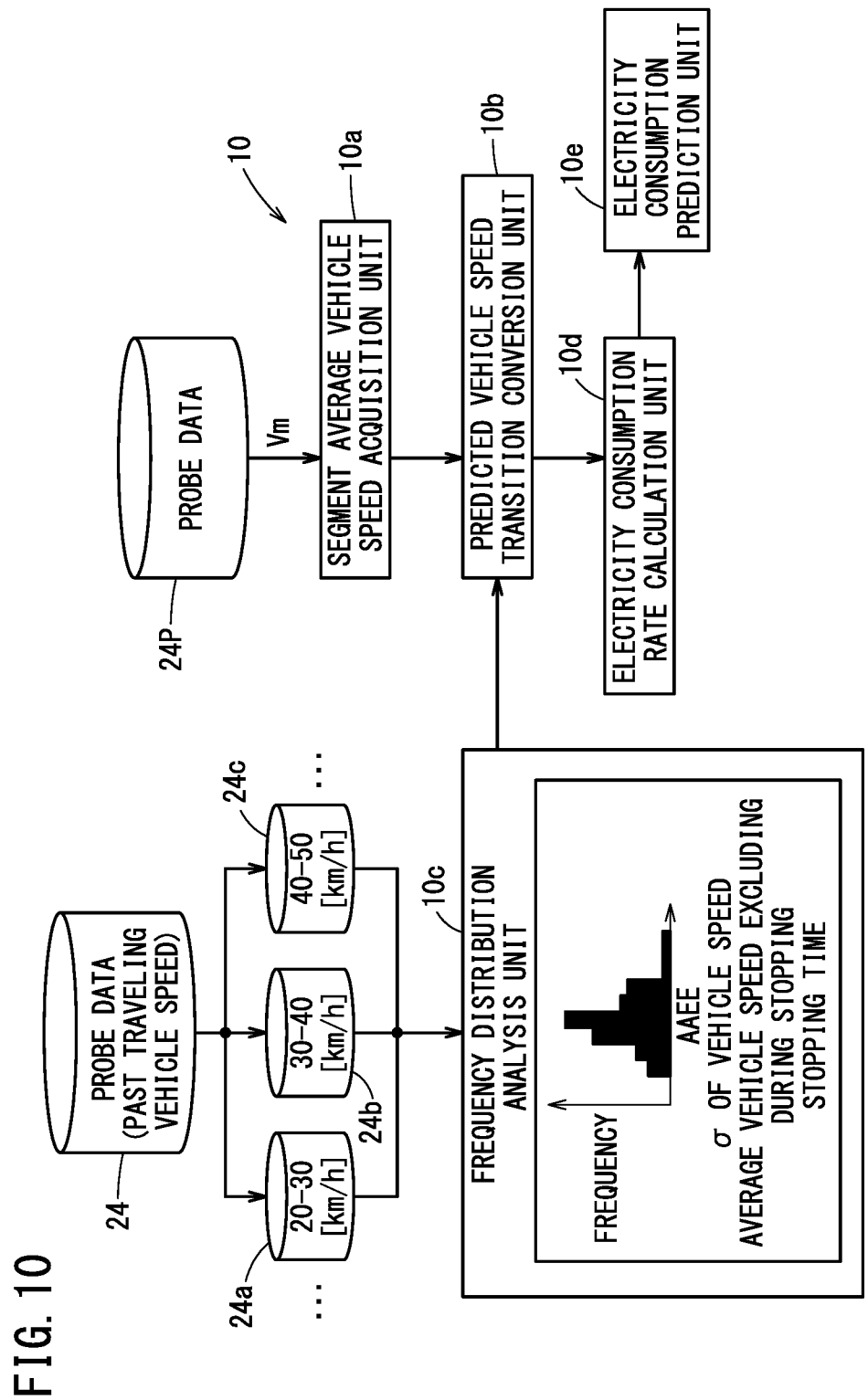
FIG. 10 is a functional block diagram of the electricity consumption rate predicting device.

(3) A method for predicting an electricity consumption rate and an electricity consumption in a specific segment (link) in a case where the specific segment (link) is set in the navigation device 22 will be described based on the functional block of the electricity consumption rate predicting device 10 shown in FIG. 10. Contents that overlap with those described above will be omitted.

The functional block includes a segment average vehicle speed acquisition unit 10a, a predicted vehicle speed transition conversion unit 10b, a frequency distribution analysis unit 10c, an electricity consumption rate calculation unit 10d, and an electricity consumption prediction unit 10e.

When a specific segment (link) is set, the segment average vehicle speed acquisition unit 10a refers to the probe data 24P in the probe data storage unit 24 to acquire the segment average vehicle speed Vm in the set specific segment (link).

On the other hand, the frequency distribution analysis unit 10c specifies a vehicle speed group to which the acquired segment average vehicle speed Vm belongs, among the vehicle speed groups 24a to 24c each including vehicle speed data for a plurality of links. The frequency distribution analysis unit 10c analyzes the above-described frequency distribution of the AAEE, the standard deviation σ of the vehicle speed, the average vehicle speed excluding during stopping, and the stopping time, for the specified vehicle speed group (one of the vehicle speed groups 24a to 24c).

Next, as described with reference to FIG. 7, the predicted vehicle speed transition conversion unit 10b calculates the predicted vehicle speed transition Ve within the segment travel distance by applying the frequency distribution to the specific segment (link).

Next, the electricity consumption rate calculation unit 10d calculates the electricity consumption rate Ec by applying an electricity consumption rate model (electricity consumption rate per vehicle speed at cruising time, electricity consumption rate during acceleration) of the vehicle determined in advance for each vehicle type to the predicted vehicle speed transition Ve.

Finally, the electricity consumption prediction unit 10e calculates and predicts the electricity consumption for the specific segment (link) by multiplying the electricity consumption rate Ec by the distance in the specific segment (link).

Modification

The above embodiment can also be modified as follows.

Modification 1

The calculation processing of the electricity consumption rate Ec will be described below for a case where a standard deviation (σa) of the vehicle speed of the vehicle 16 based on the travel history for the link which is calculated from the vehicle speed data (FIG. 6) of the vehicle 16 for which the electricity consumption rate Ec is to be calculated is deviated from a standard deviation (σb) of the past vehicle speed of the vehicle 16 for the link, which is used for calculating the electricity consumption rate table 50 in FIG. 3.

In this case, the standard deviation σb of the vehicle speed in the vehicle speed variation portion (i) shown in FIG. 7 is replaced by the standard deviation σa of the vehicle speed of the vehicle 16 which is deviated from the standard deviation σb. It is preferable to change (correct) the upper and lower limit vehicle speeds in the vehicle speed variation portion (i) in FIG. 7 by using the replaced standard deviation σa of the vehicle speed and calculate an electricity consumption rate Ec after correction.

As a result, it is possible to calculate the electricity consumption rate (electricity consumption rate after correction) with high prediction accuracy in consideration of the acceleration/deceleration tendency of the user of the vehicle 16 for which the electricity consumption rate Ec is to be predicted.

Modification 2

It is also possible to configure a vehicle (vehicle capable of predicting the electricity consumption) mounted with the electricity consumption rate table 50, the navigation device 22, the program related to the flowchart of FIG. 8, and a microcomputer capable of executing the program.

In this vehicle, by the microcomputer executing the program related to the flowchart of FIG. 8, it is possible to calculate (predict) the electricity consumption for the navigation route created by the navigation device 22 mounted in the vehicle.

[Invention that can be Grasped from the Embodiment and Modifications]

The invention that can be grasped from the above-described embodiment and modifications will be described below. For convenience of understanding, some of the components are denoted by the reference numerals used in the above-described embodiment and modifications, but the components are not limited to those denoted by the reference numerals.

The electricity consumption rate predicting device according to the present invention is an electricity consumption rate predicting device 10 that predicts an electricity consumption rate of a vehicle 16 that travels by a motor, wherein the electricity consumption rate predicting device: acquires vehicle speed data of a plurality of vehicles registered for each link in map information, and average vehicle speeds Vm calculated from the vehicle speed data; divides the links into vehicle speed groups according to a magnitude of each of the average vehicle speeds; performs statistical processing on the vehicle speed data of the plurality of vehicles for each of the vehicle speed groups, and calculates, based on the statistical processing, a predicted vehicle speed transition simulating a change in vehicle speed for each of the vehicle speed groups; and applies an electricity consumption rate model of the vehicle to the calculated predicted vehicle speed transition to predict an electricity consumption rate corresponding to the average vehicle speed for each of the vehicle speed groups.

In this manner, instead of the average vehicle speed for each link, the links are divided into the vehicle speed groups according to the magnitude of the average vehicle speed, the statistical processing is performed on the vehicle speed data of the plurality of vehicles for each of the vehicle speed groups, the predicted vehicle speed transition simulating the change in the vehicle speed is calculated for each of the vehicle speed groups based on the statistical processing, and the electricity consumption rate model of the vehicle is applied to the calculated predicted vehicle speed transition to predict the electricity consumption rate corresponding to the average vehicle speed for each of the vehicle speed groups. Therefore, the prediction accuracy of the electricity consumption rate can be improved.

Further, in the electricity consumption rate predicting device, electricity consumption rates corresponding to the average vehicle speeds for the respective vehicle speed groups may be plotted, and the plotted electricity consumption rates may be interpolated to create an electricity consumption rate table 50 for the average vehicle speeds of an entire vehicle speed range registered for each link in the map information. Thus, the electricity consumption rate corresponding to the average vehicle speed for each link can be accurately determined.

Further, in the electricity consumption rate predicting device, in a case where a route connecting the links from a starting point to a destination of the vehicle is generated, the electricity consumption rates corresponding to the average vehicle speeds in the links may be calculated from the electricity consumption rate table, electricity consumptions for the respective links may be calculated by multiplying the calculated electricity consumption rates by distances of the links, and a total electricity consumption from the starting point to the destination may be calculated by adding together the electricity consumptions for the respective links from the starting point to the destination.

As a result, it is possible to predict the total electricity consumption of the vehicle traveling by the motor for the navigation route. Therefore, the anxiety for running out of electric power after starting traveling is eliminated, and the usability of the vehicle by the user is improved.

Further, in the electric cost predicting device, the predicted vehicle speed transition may be configured by allocating a vehicle speed variation portion and a cruise portion to a distance of each link, the cruise portion may correspond to a distance over which the vehicle travels at the average vehicle speed, within the distance of each link, and the vehicle speed variation portion may correspond to a remaining distance other than the distance over which the vehicle travels at the average vehicle speed, within the distance of each link, the vehicle speed variation portion being calculated from a number of accelerations, an upper limit vehicle speed obtained by adding a standard deviation to a median value, which is the average vehicle speed, a lower limit vehicle speed obtained by subtracting the standard deviation from the median value, a cruise time when traveling at the upper limit vehicle speed, and a cruise time when traveling at the lower limit vehicle speed. As a result, the prediction accuracy of the electricity consumption rate can be improved.

Further, in the electricity consumption rate predicting device, the number of accelerations may be calculated as a value obtained by dividing, by acceleration energy necessary for one vehicle speed variation, a value obtained by multiplying an acceleration energy equivalent per unit distance calculated for each link by the distance of each link. Thus, the number of accelerations can be appropriately determined.

Further, in the electricity consumption rate predicting device, when the standard deviation calculated from the vehicle speed data of the plurality of vehicles is deviated from a vehicle standard deviation that is based on a travel history indicating that the vehicle for which the electricity consumption rate is to be predicted has traveled on the link in a past, the predicted vehicle speed transition may be calculated by replacing the standard deviation of the vehicle speed variation portion with the vehicle standard deviation to calculate an electricity consumption rate after correction.

Thus, it is possible to calculate the electricity consumption rate (electricity consumption rate after correction) in consideration of the acceleration/deceleration tendency of the user of the vehicle for which the electricity consumption rate is to be predicted.

The present invention is not limited to the above-described embodiments, but it goes without saying that various additional or alternative configurations could be adopted therein based on the content disclosed in the present specification.

What is claimed is:

1. An electricity consumption rate predicting device that predicts an electricity consumption rate of a vehicle that travels by a motor, the electricity consumption rate predicting device comprising one or more processors that execute computer-executable instructions stored in a memory, wherein the one or more processors execute the computer-executable instructions to cause the electricity consumption rate predicting device to:

acquire vehicle speed data of a plurality of vehicles registered for each link in map information, and average vehicle speeds calculated from the vehicle speed data;

divide the links into vehicle speed groups according to a magnitude of each of the average vehicle speeds;

perform statistical processing on the vehicle speed data of the plurality of vehicles for each of the vehicle speed groups, and calculate, based on the statistical processing, a predicted vehicle speed transition simulating a change in vehicle speed for each of the vehicle speed groups; and apply an electricity consumption rate model of the vehicle determined in advance for each vehicle type to the calculated predicted vehicle speed transition to predict an electricity consumption rate corresponding to the average vehicle speed for each of the vehicle speed groups for each vehicle type, in calculating the predicted vehicle speed transition, allocate a vehicle speed variation portion and a cruise portion to a distance of each link, the cruise portion corresponds to a distance over which the vehicle is to travel at the average speed, within the distance of each link, the vehicle speed variation portion corresponds to a remaining distance other than the distance over which the vehicle is to travel at the average vehicle speed, within the distance of each link, the vehicle speed variation portion being calculated from a number of accelerations, an upper limit vehicle speed obtained by adding a standard deviation to a median value, which is the average vehicle speed, a lower limit vehicle speed obtained by subtracting the standard deviation from the median value, a cruise time when traveling at the upper limit vehicle speed, and a cruise time when traveling at the lower limit vehicle speed, and the number of accelerations is calculated as a value obtained by dividing, by acceleration energy necessary for one vehicle speed variation, a value obtained by multiplying an acceleration energy equivalent per unit distance calculated for each link by the distance of each link.

2. The electricity consumption rate predicting device according to claim 1, wherein the one or more processors causes the electricity consumption rate predicting device to plot electricity consumption rates corresponding to the average vehicle speeds for the respective vehicle speed groups, and interpolate the plotted electricity consumption rates to create an electricity consumption rate table for the average vehicle speeds of an entire vehicle speed range registered for each link in the map information.

3. The electricity consumption rate predicting device according to claim 2, wherein in a case where a route connecting the links from a starting point to a destination of the vehicle is generated, the one or more processors causes the electricity consumption rate predicting device to:

calculate the electricity consumption rates corresponding to the average vehicle speeds in the links from the electricity consumption rate table;

calculate electricity consumptions for the respective links by multiplying the calculated electricity consumption rates by distances of the links; and calculate a total electricity consumption from the starting point to the destination by adding together the electricity consumptions for the respective links from the starting point to the destination.

4. The electricity consumption rate predicting device according to claim 1, wherein when the standard deviation calculated from the vehicle speed data of the plurality of vehicles is deviated from a vehicle standard deviation that is based on a travel history indicating that the vehicle for which the electricity consumption rate is to be predicted has traveled on the link in a past, the one or more processors causes the electricity consumption rate predicting device to calculate the predicted vehicle speed transition by replacing the standard deviation of the vehicle speed variation portion with the vehicle standard deviation to calculate an electricity consumption rate after correction.

\* \* \* \* \*